US009873817B2

(12) United States Patent
Minesso et al.

(10) Patent No.: US 9,873,817 B2
(45) Date of Patent: Jan. 23, 2018

(54) BRANCHED POLYESTER FOR POWDER COATINGS

(71) Applicant: ALLNEX ITALY S.R.L., Romano d'Ezzelino (IT)

(72) Inventors: Alessandro Minesso, San Zenone degli Ezzelini (IT); Roberto Cavalieri, Padova (IT); Robertino Chinellato, Spinea-Venezia (IT)

(73) Assignee: ALLNEX ITALY SRL, Romano D'Ezzelino (IT)

( * ) Notice: Subject to any disclaimer, the term of this patent is extended or adjusted under 35 U.S.C. 154(b) by 35 days.

(21) Appl. No.: 14/177,581

(22) Filed: Feb. 11, 2014

(65) Prior Publication Data

US 2014/0163157 A1 Jun. 12, 2014

Related U.S. Application Data

(62) Division of application No. 12/595,255, filed as application No. PCT/EP2008/053436 on Mar. 21, 2008, now abandoned.

(30) Foreign Application Priority Data

Apr. 13, 2007 (EP) .................... 07007564

(51) Int. Cl.
*C09D 167/02* (2006.01)
*C08G 63/91* (2006.01)
*C08G 63/20* (2006.01)
*C08G 63/46* (2006.01)
*C09D 5/03* (2006.01)
*C09D 167/00* (2006.01)
*C08L 67/00* (2006.01)

(52) U.S. Cl.
CPC .......... *C09D 167/02* (2013.01); *C08G 63/20* (2013.01); *C08G 63/46* (2013.01); *C08G 63/914* (2013.01); *C09D 5/032* (2013.01); *C09D 167/00* (2013.01); *C08L 67/00* (2013.01)

(58) Field of Classification Search
CPC .... C09D 167/00; C09D 167/02; C09D 5/032; C08L 2666/18; C08L 67/00; C08G 63/20; C08G 63/46; C08G 63/914
See application file for complete search history.

(56) References Cited

U.S. PATENT DOCUMENTS

| 4,076,917 A | 2/1978 | Swift et al. |
| 4,727,111 A | 2/1988 | Pettit, Jr. et al. |
| 4,788,255 A | 11/1988 | Pettit, Jr. et al. |
| 2004/0071955 A1 | 4/2004 | Moens et al. |

FOREIGN PATENT DOCUMENTS

| EP | 0 244 823 | 11/1987 |
| EP | 0 322 834 | 7/1989 |
| EP | 0 473 380 | 3/1992 |
| EP | 2 014 732 | 1/2009 |
| JP | 8-120061 | 5/1996 |
| JP | 2002-121363 | 4/2002 |
| JP | 2006-504832 | 2/2006 |
| WO | 01/00740 | 1/2001 |
| WO | 03/082996 | 10/2003 |
| WO | 2004/000958 | 12/2003 |
| WO | 2004-041904 | 5/2004 |

OTHER PUBLICATIONS

Taiwan counsel report of Taiwanese Office Action dated Sep. 11, 2013 in corresponding Taiwanese Patent Application No. 97113125.
Database WPI Week 200624, Derwent Publications Ltd., London, GB, AN 2006-225258, XP002446104, & JP2006070082 A (Dainippon Ik & Chem Inc), Mar. 16, 2006.
Database WPI Week 199812, Derwent Publications Ltd., London, GB, AN 1998-126349, XP002446105, & JP10007944 A (Nippon Ester Co Ltd), Jan. 13, 1998.
ESP@CENET—Bibliographic data; JP2008201869 (A), Sep. 4, 2008, Matsuda Takeshi (Inventor), Nippon Ester Co Ltd (Applicant).

*Primary Examiner* — Ling Choi
*Assistant Examiner* — Gennadiy Mesh
(74) *Attorney, Agent, or Firm* — Wenderoth, Lind & Ponack, L.L.P.

(57) ABSTRACT

A thermosetting powder coating composition comprising a binder, wherein 100 parts by weight of the binder comprises (A) from 30 to 70 parts by weight of at least one carboxylic acid functional branched polyester having an acid number of at least 77 mg KOH/g, and (B) from 70 to 30 parts by weight of at least one carboxylic acid functional polyester having an acid number of lower than 50 mg KOH/g. The thermosetting powder composition may be used for coating metallic and non-metallic substrates, it provides outstanding flow and permits to obtain low gloss coatings, provides excellent mechanical properties, and exhibits good solvent resistance and weathering.

9 Claims, No Drawings

BRANCHED POLYESTER FOR POWDER COATINGS

This invention relates to a carboxylic acid anhydride end-capped polyester and its use in thermosetting powder coating applications. The invention also relates to the use of said compositions for the preparation of powdered paints and varnishes which provides low gloss coatings, providing an outstanding flow, excellent mechanical properties, good solvent resistance and weathering.

At the present time, powdered thermosetting compositions are widely used for coating the most various articles. The majority of these coating compositions provide coatings having a high gloss after fusion and curing which is in fact very often equal to or even greater than 90%.

There is an increasing demand for powdered paints and varnishes which provide coatings of good quality and with a reduced gloss, for example for coating certain accessories in the automotive industry, such as wheel rims, bumpers and the like, or for coating metal panels and beams used in construction.

Powder coating compositions comprising as a binder a mixture of a carboxylic acid group containing polyester and acrylic resins have been described for example in WO 04/000958 for giving low gloss coatings and "dead matt" characteristics, indicated by a gloss as measured at a geometry of 60° according to the ASTM D523 standard of from 0 to 10%. Japanese patent abstract JP2006070082 describes low gloss compositions comprising an amorphous polyester having an acid valid lower than 50 and a crystalline polyester having an acid value of more than 70. Japanese patent abstract JP 10007944 also describes low gloss compositions comprising non gelled polyesters wherein the difference in gelation time of these polyesters is at least 3 minutes. The powder described in Example 7 of this patent application seems to be obtained from a blend of a polyester having an acid number of 15 and a polyester having an acid number of 85 obtained from ethylene glycol. This ethylene glycol introduces a high degree of crystallinity in the polyester. Crystalline polyesters present the drawback that they are difficult to process and are making the powder processing difficult and expensive.

Applicants have now found a particular carboxylic acid polyester which does not present the drawbacks of the known polyesters and which, when used in a binder composition in combination with a known carboxylic acid group containing polyester and a crosslinking agent, permits to obtain low gloss coatings providing an outstanding flow, excellent mechanical properties, good solvent resistance and weathering.

The present invention therefore relates to a carboxylic acid functional branched polyester having an acid number of at least 77 mg KOH/g, said carboxylic acid functional branched polyester being the reaction product of a polybasic organic carboxylic acid and/or its anhydride and a branched hydroxyl functional polyester obtained from (i) 70 to 100 mole % of terephthalic acid and/or isophtalic acid and, optionally, 0 to 30 mole % of another polycarboxylic acid, referring to the polyacid constituents, (ii) 10 to 50 mole % of ethylene glycol, 50 to 88.5 mole % of at least one other aliphatic or cycloaliphatic diol and 1.5 to 15 mole % of at least one polyol having at least 3 hydroxyl groups, referring to the polyol constituents.

By branched carboxylic acid functional polyester is meant to designate in the present invention a polyester having free, generally terminal, carboxyl groups and having an acid number of at least 77 mg KOH/g, as measured according to DIN 53402 standard, and comprising a functionality of more than 2.

The branched carboxylic acid functional polyester preferably has an acid number of at least 80 mg KOH/g, more preferably greater than 82 and most preferably of at least 85 mg KOH/g. The acid number preferably does not exceed 120 mg KOH/g.

The branched carboxyl functional polyesters according to the present invention, more preferably have a functionality of at least 2.5, most preferably of at least 3. By functionality is meant the average number of reactive groups per molecule.

The branched carboxyl functional polyesters according to the present invention preferably have a number averaged molecular weight Mn ranging from 1100 to 5000 and more preferably from 1600 to 3500, measured by gel permeation chromatography (GPC).

The branched carboxyl functional polyesters according to the present invention preferably have a weight averaged molecular weight Mw ranging from 4000 to 30000 and more preferably from 5000 to 20000, measured by gel permeation chromatography (GPC).

The branched carboxyl functional polyesters according to the present invention preferably have a polydispersity, that is Mw/Mn of from 3 to 7, more preferably higher than 3.5.

The branched carboxyl functional polyesters according to the present invention preferably have a glass transition temperature (Tg) from 40 to 80° C., measured by Differential Scanning calorimetry according to ASTM D3418 with a heating gradient of 20° C. per minute.

The branched carboxyl functional polyesters according to the present invention preferably have a Brookfield cone and plate viscosity measured according to ASTM D4287-88 at 200° C., ranging from 5 to 15000 mPa·s, more preferably from 1000 to 5000 mPa·s.

The branched carboxylic acid functional polyesters are obtained from the reaction of a branched hydroxyl functional polyester with a polybasic acid and/or its anhydride.

By branched hydroxyl functional polyester is meant to designate in the present invention a polyester having free, generally terminal, hydroxyl groups having an hydroxyl number of 10 to 100 mg/KOH, preferably from 15 to 70 mg KOH/g, and having a functionality of more than 2. This branched hydroxyl functional polyester generally has a residual acid value of 5 to 60 mg KOH/g.

The branched hydroxyl functional polyesters used in the present invention, more preferably have a functionality of at least 2.2, most preferably of at least 2.5.

The branched hydroxyl functional polyester is obtained from the reaction of polyacid constituents and polyol constituents. Referring to the polyacid constituents, 70 to 100 mole % of terephthalic acid and/or isophthalic acid and, optionally, from 0 to 30 mole % of another polycarboxylic acid are used.

These other polycarboxylic acids are generally chosen from aliphatic, cycloaliphatic or aromatic dicarboxylic acids or their anhydrides, such as fumaric acid, maleic acid, o-phthalic acid, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azelaic acid, sebacic acid, dodecanedioic acid, undodecanedioic, tridecanedioic acid, tetradecanedioic acid and their corresponding anhydrides. When high durability is aimed for, it is preferred to use high amount of isophthalic acid.

Referring to the polyol constituents, 10 to 50 mole % of ethylene glycol, 50 to 88.5 mole % of at least one other aliphatic or cycloaliphatic diol and 1.5 to 15% mole of at least one polyol having at least 3 hydroxyl groups are used. The other aliphatic or cycloaliphatic diol is preferably selected from neopentyl glycol, 1,2-propanediol, 1,3-propanediol, 1,4-butanediol, 1,5-pentanediol, 1,6-hexanediol, 1,7-heptanediol and 1,8-octanediol 1,4-cyclohexanepolyol, 1,4-cyclohexanedimethanol, 2-methyl-1,3-propanepolyol, 2-butyl-2-ethyl-1,3-propane diol and hydrogenated Bisphenol A. Neopentyl glycol is preferred. The quantity of the other aliphatic or cycloaliphatic diol is preferably from 50 to 88, more preferably from 50 to 87 mole % referring to the polyol constituents.

The branched hydroxyl functional polyester used in the invention is obtained from at least one polyol having at least 3 hydroxyl groups. Preferably polyols having a hydroxyl functionality of at least 3, more preferably not more than 8, such as trimethylolpropane, ditrimethylol propane, trimethylolethane, pentaerythrytol, dipentaerythrytol, glycerol and any mixture thereof, are used. Triols are preferred. Glycerol, trimethylolpropane and mixtures thereof are particularly preferred. The amount of polyol having at least 3 hydroxyl groups used is preferably at least 2 mole % referring to the polyol constituents, more preferably at least 3 mole % and most preferably at least 5 mole %. The amount of polyol used is preferably at most 10 mole % referring to the polyol constituents. Particularly preferred are branched polyesters obtained from 1.5 to 15 mole %, more preferably from 2 to 10 mole %, and most preferably from 3 to 10 mole %, of polyols having a functionality of at least 3, more particularly triols.

The branched carboxylic acid functional polyester according to the invention and the branched hydroxyl functional polyester used are generally amorphous polyesters, that are polyesters showing no or only trace crystallization and presenting no melting point as measured by Differential Scanning Calorimetry according to ASTM D3418 with a heating gradient of 20° C. per minute.

By polybasic organic carboxylic acid is meant in to designate organic compounds comprising at least 3 carboxylic acid groups. The polybasic organic acids and/or the anhydride of a polybasic acid used in the present invention are preferably selected from trimellitic acid, pyromellitic acid, trimellitic anhydride and pyromellitic anhydride and any mixture thereof. Trimellitic anhydride is most preferred.

The branched carboxylic acid functional polyesters according to the present invention are preferably prepared from the ring-opening reaction of the anhydride group of at least one, and more preferably at least two mole(s), of anhydride of the polybasic organic carboxylic acid per mole of branched hydroxyl functional polyester.

The polyesters according to the present invention may be prepared using conventional esterification techniques well known in the art. The polyesters are preferably prepared according to a procedure consisting of one or more reaction steps. For the preparation of these polyesters, a conventional reactor equipped with a stirrer, an inert gas (nitrogen) inlet, a thermocouple, a distillation column connected to a water-cooled condenser, a water separator and a vacuum connection tube are used. The esterification conditions used to prepare the polyesters are conventional, namely a standard esterification catalyst, such as dibutyltin oxide, dibutyltin dilaurate, n-butyltin trioctoate, sulfuric acid or a sulphonic acid, can be used in an amount from 0.05 to 1.50% by weight of the reactants and optionally, color stabilizers, for example, phenolic antioxidants such as Irganox 1010 (Ciba) or phosphonite- and phosphite-type stabilizers such as tributylphosphite, can be added in an amount from 0 to 1% by weight of the reactants. Polyesterification is generally carried out at a temperature which is gradually increased from 130° C. to about 190 to 250° C., first under normal pressure, then, when necessary, under reduced pressure at the end of each process step, while maintaining these operating conditions until a polyester with the desired hydroxyl and/or acid number is obtained. The degree of esterification is monitored by determining the amount of water formed in the course of the reaction and the properties of the obtained polyester, for example, hydroxyl number, acid number, and viscosity.

It has been found that the branched carboxylic acid functional polyesters according to the invention permit to obtain low gloss coatings providing an outstanding flow, excellent mechanical properties, good solvent resistance and weathering when used in combination with a known carboxylic acid functional polyester having an acid number lower than 50 mg KOH/g.

The present invention therefore also relates to a thermosetting powder coating composition comprising a binder wherein 100 parts by weight of this binder comprises (A) from 30 to 70 parts by weight of at least one carboxylic acid functional branched polyester according to the invention as described here above, (B) from 70 to 30 parts by weight of at least one carboxylic acid functional polyester having an acid number of lower than 50 mg KOH/g, and optionally (C) from 3 to 20 parts by weight of at least one crosslinking agent having functional groups reactable with the polyesters (A) and (B) carboxylic acid groups.

Carboxylic acid functional polyesters (B) having an acid number lower than 50 mg KOH/g have been described before. They generally are obtained from the polycondensation of terephthalic acid and/or isophthalic acid with neopentyl glycol accordingly a one or more reaction step procedure. Up to 15% mole of the terephthalic or isophthalic acid can be replaced by another cyclo(aliphatic) or aromatic polyacid; diacids are preferred. Up to 15% mole of the neopentyl glycol can be replaced by another (cyclo)aliphatic polyol; diols are preferred. Polyesters with an acid number of less than 40 mg KOH/g are preferred. Linear polyesters with an acid number of less than 30 mg KOH/g are particularly preferred.

The crosslinking agent (C) used in the composition in accordance to the present invention, having functional groups reactive with the polyester's carboxylic acid groups, is preferably selected from:

polyepoxy compounds, which are solid at room temperature and contain at least two epoxy groups per molecule, such as, for example, triglycidyl isocyanurate (TGIC), diglycidyl terephthalate, triglycidyl trimellitate, or mixutres thereof, and ARALDITE®PT910 or PT 912 (HUNTSMAN).

β-hydroxyalkylamides which contains at least one, preferably two bis(β-hydroxyalkyl)amide groups such as those mentioned in U.S. Pat. Nos. 4,727,111, 4,788, 255, 4,076,917, EP 322,834 and EP 473,380.

β-hydroxyalkylamide group containing compounds are particularly preferred. Most preferred are β-hydroxyalkylamide group containing compounds having more than 3, preferably 4 β-hydroxyalkylgroups, such as PRIMID®XL-552.

To the polyesters, crosslinking catalysts can optionally be added in order to accelerate crosslinking reactions of the thermosetting powder composition during curing. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide (BETP) or tetrapropylphosphonium chloride). These catalysts are preferably used in an amount of from 0.1 to 5% with respect to the weight of the binder.

The binder system of the thermosetting composition of the invention is generally composed in such a way that for each equivalent of carboxyl group present in the branched carboxylic acid functional polyester (A) and carboxylic acid functional polyester (B), there is between 0.3 and 2.0 and preferably between 0.6 and 1.7 equivalents of epoxy groups and/or hydroxyl groups from the crosslinking agent (C).

The thermosetting polyester blend (A) and (B) can be obtained by dry blending the polyesters using a mechanical mixing procedure as available for the premixing of the powder paint constituents. Both the polyesters (A) and (B) can also be blended in the melt using the conventional cylindrical double-walled reactor or by extrusion such as a Buss Ko-Kneter or a APV-extruder In addition to the components described above, compositions within the scope of the present invention can also include one or more components such as flow control agents, for example RESIFLOW®P-67 and PV5 (WORLEE), ADDITOL®, MODAFLOW® (CYTEC), ACRONAL®4F (BASF), degassing agents such as Benzoin (BASF), fillers, UV-light absorbers such as TINUVIN®900 (CIBA), hindered amine light stabilizers such as TINUVIN®144 (CIBA), other stabilizing agents such as TINUVIN®312 and 1130 (CIBA), antioxidants such as IRGANOX®1010 (CIBA) and stabilizers of the phosphonite or phosphite types, pigments and dyes.

Both pigmented and clear lacquers can be prepared. A variety of dyes and pigments can be utilized in the composition of this invention. Examples of useful pigments and dyes are: metallic oxides such as titanium dioxide, iron oxide, zinc oxide and the like, metal hydroxides, metal powders, sulphides, sulphates, carbonates, silicates such as ammonium silicate, carbon black, talc, china clay, barytes, iron blues, lead blues, organic reds, organic maroons and the like.

The thermosetting powder composition usually contains less than 50 parts by weight of these components.

The components of the composition according to the invention may be mixed by dry blending in a mixer or blender (e.g. drum mixer). The premix is then generally homogenized at temperatures ranging from 50 to 120° C. in a single screw extruder such as the BUSS-Ko-Kneter or a twin screw extruder such as the PRISM or APV. The extrudate, when cooled down, is generally ground to a powder with a particle size ranging from 10 to 150 μm. The powdered composition may be deposited on the substrate by use of a powder gun such as an electrostatic CORONA gun or a friction charging TRIBO spray gun. On the other hand, well known methods of powder deposition such as the fluidized bed technique can also be used. After deposition the powder is usually heated to a temperature between 160 and 250° C., preferably at about 200° C. causing the particles to flow and fuse together to form a smooth, uniform, continuous, non-cratered coating on the substrate surface.

The thermosetting powder composition according to the present invention may be used for coating metallic as well as non-metallic substrates. The thermosetting powder compositions according to the invention are providing an outstanding flow and permit to obtain low gloss coatings, excellent mechanical properties, good solvent resistance and weathering.

Low gloss coatings presenting low gloss and even "dead matt" characteristics can be obtained. Glosses measured at a geometry of 60° according to the ASTM D523 standard of lower than 40%, especially lower than 35%, and even from 0 to 10% can be obtained.

Entirely or partially coated substrates wherein the coating material used is a thermosetting powder coating composition according to the invention are also an object of the present invention.

The following examples are submitted for a better understanding of the invention without being restricted thereto.

EXAMPLE 1

890 parts of neopentyl glycol, 176 parts of ethylene glycol and 60 parts of glycerol are placed in a conventional four neck round bottom flask equipped with a stirrer, a distillation column connected to a water cooled condenser, an inlet for nitrogen and a thermometer attached to a thermoregulator. The flask contents are heated, while stirring under nitrogen, to a temperature of circa 140° C. at which point 1406 parts of terephthalic acid, 192 parts of isophthalic acid and 2.2 parts of monobutyltinoxide are added. The flask contents further are heated to a temperature of 235° C. The reaction is continued at 235° C. under atmospheric pressure until a hydroxyl functionalised prepolymer with following characteristics is obtained: AN=12 mg KOH/g, OHN=57 mg KOH/g, Brfld200° C. (Cone/Plate)=400 mPa·s, after which the flask contents are cooled down to 190° C. To the first step hydroxyl functional polymer standing at 190° C., 140 parts of adipic acid and 4.5 parts of triisooctylphosphite are added. Thereupon, the mixture is gradually heated to 225° C. and a slight vacuum is applied until a resin with following characteristics is obtained: AN=21 mg KOH/g, OHN=34 mg KOH/g, Brfld200° C. (Cone/Plate)=1900 mPa·s, after which the flask contents are cooled down to 190° C.

To this second step polymer standing at 190° C., 372 parts of trimellitic anhydride is added and the mixture is gradually heated up and continued until a resin with following characteristics is obtained: AN=90 mg KOH/g, Brfld200° C. (Cone/Plate)=2500 mPa·s. The carboxyl functionalised polyester is then cooled down. A polyester with a Brfld200° C.(Cone/Plate) viscosity of 3500 mPas was obtained. Examples 2 to 4 and comparative examples 5R to 9R:

The procedure of Example 1 was followed except that the constituents and amounts (in parts by weight) as described in Table 1 have been used.

The properties of the obtained polyesters are mentioned in Table 1

TABLE 1

| | Example number | | | | | | | |
|---|---|---|---|---|---|---|---|---|
| | 2 | 3 | 4 | 5R | 6R | 7R | 8R | 9R |
| 1st step | | | | | | | | |
| Neopentyl glycol | 890 | 890 | 870 | 890 | 955 | 1180 | 890 | 890 |
| Ethylene glycol | 176 | 176 | 172 | 176 | 197 | | | |
| Diethylene glycol | | | | | | | 290 | |
| 1,6-Hexane-diol | | | | | | | | 322 |

TABLE 1-continued

| | Example number | | | | | | | |
|---|---|---|---|---|---|---|---|---|
| | 2 | 3 | 4 | 5R | 6R | 7R | 8R | 9R |
| Glycerol | | 40 | | | | 60 | 60 | 60 |
| Trimethylol propane | 86.5 | | 110 | | | | | |
| Trimellitic anhydride | | | | | 124 | | | |
| Isophthalic acid | 392 | 405 | 1800 | 250 | 357 | 392 | 250 | 250 |
| Terephthalic acid 2° step | 1406 | 1393 | | 1406 | 1280 | 1406 | 1530 | 1530 |
| Adipic acid | 140 | 85 | 140 | | | 140 | 140 | |
| Isophthalic acid Final step | | | | 142 | | | 177 | 177 |
| Trimellitic anhydride | 372 | 372 | 372 | 372 | 372 | 372 | 372 | 372 |
| Properties | | | | | | | | |
| AN | 89 | 84 | 90 | 90 | 89 | 89 | 87 | 88 |
| Viscosity | 3000 | 2900 | 2400 | 1600 | 2200 | 2800 | 2500 | 2900 |

A powder coating composition comprising as a binder
372 parts of, respectively, polyester of Example 1, 2 or Comparative Examples 5R to 9R
372 parts of a carboxylic polyester with acid value lower than 50 mgKOH/g, commercialized under the name of CRYLCOAT®E 04211
60 parts of the curing agent ((3-hydroxyalkylamide PRIMID®XL-552)
and in addition thereto 10 parts of flow modifier MODAFLOW®P 6000, 3 parts of benzoin, 148 parts of Blanc Fixe ABR and 35 parts of brown pigment RAL 8014 was prepared.

The components of the composition were mixed by a MTI mill at 2000 rpm. The premix was then homogeneized using a Buss PCS 30 extruder at temperatures ranging from 50 to 200° C. The extrudate, when cooled down, was ground and sieved to obtain a powder with a particle size of about 90 μm. The powdered composition was deposed on cold rolled steel by electrostatic deposition using a GEMA spray gun. At a thickness between 50 and 80 μm the panels were transferred to an air-ventilated oven and cured for 10 minutes at a temperature of 200° C.

The branched polyester of Example 3 was used to prepare a powder composition and applied in the same way as described here above, except that it was used in combination with a carboxylic acid functional polyester with an acid value lower than 50 mg KOH/g commercialized under the name of CRYLCOAT®E04238.

The branched polyester of Example 4 was also used to prepare a powder composition and applied in the same way as described here above, except that it was used in combination with a superdurable carboxylic acid functional polyester with an acid value lower than 50 mg KOH/g commercialized under the name of CRYLCOAT®E04251.

In all cases smooth, uniform, continuous, uncratered coatings on the substrate surface were obtained.

The paint characteristics for the finished coatings obtained are presented in Table 2 hereunder. The final objects were evaluated as to their gloss (%), measured at 60° according to the ASTM D523 standard.

These results show the unexpected properties obtained with the branched polyesters according to the invention.

| | Coating obtained using polyester of Ex. | | | | | | | | |
|---|---|---|---|---|---|---|---|---|---|
| | 1 | 2 | 3 | 4 | 5R | 6R | 7R | 8R | 9R |
| Gloss (%) at 60° | 7 | 8 | 24 | 7 | 83 | 68 | 90 | 56 | 60 |

The invention claimed is:

1. A thermosetting powder coating composition comprising a binder wherein 100 parts by weight of this binder comprises
    (A) from 30 to 70 parts by weight of at least one amorphous carboxylic acid functional branched polyester having an acid number of at least 77 mg KOH/g, and
    (B) from 70 to 30 parts by weight of at least one amorphous carboxylic acid functional polyester having an acid number of lower than 50 mg KOH/g,
        wherein said carboxylic acid functional branched polyester (A) having an acid number of at least 77 mg KOH/g is produced by reacting:
    a polybasic organic carboxylic acid comprising at least 3 carboxylic acid groups and/or its anhydride, and
    a branched hydroxyl functional polyester obtained from
        (i) 70 to 100 mole % of terephthalic acid and/or isophthalic acid based on the polyacid constituents and,
        (ii) 10 to 50 mole % of ethylene glycol, 50 to 88.5 mole % of at least one other aliphatic or cycloaliphatic diol, and 1.5 to 15 mole % of at least one polyol having at least 3 hydroxyl groups based on the polyol constituents,
        wherein said carboxylic acid functional polyester (B) having an acid number of lower than 50 mg KOH/g is produced by polycondensation of terephthalic acid and/or isophthalic acid with neopentyl glycol, wherein up to 15 mole % of the terephthalic or isophthalic acid can be substituted with another cycloaliphatic or aromatic polyacid, and up to 15 mole % of the neopentyl glycol can be substituted with another cycloaliphatic polyol, and
        wherein the thermosetting powder composition has a gloss below 25%, measured at 60° according to the ASTM D523 standard.

2. The composition according to claim 1, wherein the anhydride of the polybasic organic carboxylic acid used to prepare the polyester (A) is trimellitic anhydride.

3. The composition according to claim 1, wherein said other aliphatic or cylcoaliphatic diol used to prepare the polyester (A) is neopentyl glycol.

4. The composition according to claim 1, wherein the polyol having at least 3 hydroxyl groups that is used to prepare the polyester (A) is a triol.

5. The composition according to claim 4, wherein the triol is glycerol, trimethylolpropane or a mixture thereof.

6. The composition according to claim 1, wherein the polyester (A) has a polydispersity Mw/Mn of from 3 to 7.

7. The composition according to claim 1, wherein the branched hydroxyl functional polyester used to prepare the polyester (A) has a functionality of at least 2.2.

8. The composition according to claim 1, further comprising: (C) from 3 to 20 parts by weight of at least one crosslinking agent having functional groups reactable with the carboxylic acid groups of polyesters (A) and (B).

9. The composition according to claim 8, wherein the crosslinking agent (C) is a β-hydroxyalkylamide group containing compound.

* * * * *